United States Patent
Genghi (10) Patent No.: US 7,903,719 B2
(45) Date of Patent: Mar. 8, 2011

(54) OPTIMAL USE OF RESOURCES FOR SIGNAL PROCESSORS

(75) Inventor: Angelo Genghi, Moltrasio (IT)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 11/641,118

(22) Filed: Dec. 19, 2006

(65) Prior Publication Data

US 2007/0183487 A1 Aug. 9, 2007

Related U.S. Application Data

(60) Provisional application No. 60/752,032, filed on Dec. 21, 2005.

(51) Int. Cl.
H04B 1/00 (2006.01)
(52) U.S. Cl. .................. 375/140; 375/130; 375/150
(58) Field of Classification Search .................. 375/140, 375/130, 150; 370/319, 320, 321, 330, 335, 370/342
See application file for complete search history.

(56) References Cited

U.S. PATENT DOCUMENTS

| | | | |
|---|---|---|---|
| 5,293,170 A * | 3/1994 | Lorenz et al. ............... 342/352 |
| 5,600,670 A | 2/1997 | Turney | |
| 5,610,984 A * | 3/1997 | Lennen ..................... 380/270 |
| 5,852,630 A * | 12/1998 | Langberg et al. ............ 375/219 |
| 5,901,171 A | 5/1999 | Kohli et al. | |
| 5,952,960 A | 9/1999 | Lennen | |
| 6,175,848 B1 | 1/2001 | Riley | |
| 6,195,041 B1 | 2/2001 | Gardner et al. | |
| 6,208,291 B1 | 3/2001 | Krasner | |
| 6,298,083 B1 | 10/2001 | Westcott et al. | |
| 6,304,216 B1 | 10/2001 | Gronemeyer | |
| 6,324,227 B1 | 11/2001 | Kang et al. | |
| 6,393,046 B1 | 5/2002 | Kohli et al. | |
| 6,400,753 B1 | 6/2002 | Kohli et al. | |
| 6,496,145 B2 | 12/2002 | Gronemeyer | |
| 6,522,682 B1 | 2/2003 | Kohli et al. | |
| 6,577,271 B1 | 6/2003 | Gronemeyer | |
| 6,606,346 B2 | 8/2003 | Abraham et al. | |
| 6,618,670 B1 | 9/2003 | Chansarkar | |
| 6,636,178 B2 | 10/2003 | Gronemeyer | |
| 6,683,923 B1 | 1/2004 | Butts, Jr. | |
| 6,704,348 B2 | 3/2004 | Abraham et al. | |
| 6,748,015 B2 | 6/2004 | Kohli et al. | |
| 6,760,363 B1 | 7/2004 | Bettaieb | |
| 6,788,735 B2 | 9/2004 | Kohli et al. | |
| 6,804,290 B1 | 10/2004 | King et al. | |
| 6,831,911 B1 | 12/2004 | Sridharan et al. | |
| 6,850,557 B1 | 2/2005 | Gronemeyer | |
| 6,891,499 B2 | 5/2005 | Dooley et al. | |
| 6,933,886 B1 | 8/2005 | Sahai et al. | |
| 6,934,322 B2 | 8/2005 | King et al. | |
| 7,127,351 B2 | 10/2006 | Norman et al. | |
| 2002/0015456 A1 | 2/2002 | Norman et al. | |
| 2004/0247019 A1 * | 12/2004 | McDonough et al. ........ 375/148 |
| 2005/0129146 A1 | 6/2005 | Akopian et al. | |

* cited by examiner

FOREIGN PATENT DOCUMENTS

WO  WO 03/030391 A2  4/2003

*Primary Examiner* — Shuwang Liu
*Assistant Examiner* — Helene Tayong
(74) *Attorney, Agent, or Firm* — Shyam K. Parekh (57) ABSTRACT

Systems, methods and devices for signal processing are presented. In particular, methods for the detection of signals in CDMA-based systems are presented, together with corresponding devices. These methods provide more efficient use of correlation resources through proper identification of candidate signal peaks and may include performing at least one pre-detection stage and performing at least one distillation stage.

28 Claims, 8 Drawing Sheets

60 Baseband Processor
61 Correlation Engine
62 Circuitry including physical taps
63 Circuitry including independent physical taps
64 Digital Signal Processor (DSP)
65 Communication Link
66 Communication Link

80 Frequency/Code Search Space
81 Candidate Pairs
82 Horizontal Axis
83 Vertical Axis
84 Quarter Chip Distance
85 One or One-Half Bin Distance

OPTIMAL USE OF RESOURCES FOR SIGNAL PROCESSORS

The present application claims benefit of priority to U.S. Provisional Application Ser. No. 60/752,032, filed Dec. 21, 2005, the entire contents of which is incorporated herein by reference.

BACKGROUND OF THE INVENTION

The embodiments of the present invention are broadly concerned with devices and methods for signal processing. These devices and methods are believed to be particularly useful in environments where high-sensitivity performance is required, for example for use with low-power spread-spectrum signals. More particularly, the embodiments are believed to be useful in systems employing orthogonal code multiplexing systems such as code division multiple access (CDMA) or similar methods, and/or for positioning systems, such as Global Navigation Satellite Systems (GNSS) such as the Global Positioning System or Galileo. In particular, embodiments of the present invention are useful in maximizing the performance of resources available in signal processing receivers to achieve the fastest signal acquisition times at the at lowest power, complexity and cost of production.

In one particular example, there is current interest in the ability to process low-power GPS signals that might occur in difficult environments, such as inside buildings. Signals in such environments typically have a total power of less than or equal to −145 dBmW and more usually −150 dBmW to −160 dBmW.

One particular challenge with regard to low-power GPS signals is the acquisition time, or the time required to recognize and be able to track a satellite signal. The signal received at a GPS receiver is a composite of the desired GPS satellite signal, other GPS satellite signals, radiation in the same frequency range, as well as noise from a variety of sources. The initial task of the GPS receiver is thus to try to separate the GPS signal of the desired satellite from all other components of the received signal.

GPS signals are spread-spectrum signals carrying a pseudorandom noise code (PN code) particular to the transmitting satellite. The PN codes for civilian use are repeated every 1 millisecond (ms). The typical acquisition method involves "finding" this PN code in the received signal, which is done by correlating a known copy of the PN code against the received signal. The process of correlation includes a multiplication step, where the received signal is multiplied by the known copy of the particular PN code, and an integration (or "accumulation") step, where the product of the received signal and the particular PN code are integrated over the code phase. If the known PN code is correctly aligned with a received signal carrying the same PN code, a high integration value (or "peak") will result.

There are several difficulties to be overcome, the primary two of which are a determination of the code phase and a determination of the signal frequency. The code phase refers to the starting and ending points in time of the PN code carried by the received signal. Since the receiver has at best only imprecise knowledge of the present GPS time, of its own location and the location of the transmitting satellite, it can not determine when the PN code will begin or end by its local clock. In other words, the receiver does not know where in time the 1 ms boundary of the repeating PN code is. If the receiver has no information that would allow it to estimate where the code phase begins, it must do a full code phase search. This typically involves performing a correlation, shifting the known PN code relative to the received signal by a fraction of a code chip, and correlating again. This process can be repeated or performed in parallel until the known PN code has been shifted by 1 ms.

The second problem is a determination of the frequency. Although satellites broadcast at a known frequency, they also move relative to the receiver, thus inducing a Doppler shift. This Doppler shift at times is sufficient to prevent acquisition of the signal. It is thus necessary to search not only different code phases, but also different frequencies if the receiver has no way to estimate the Doppler shift.

Furthermore, in low signal power environments, it is often necessary to perform the integration step of correlation over a long period of time. This period is usually several milliseconds for coherent integration, and may be up to twenty milliseconds. Longer integration can be performed incoherently, and incoherent integration times on the order of seconds are not uncommon.

To perform such operations over many code phases, many frequency domains, and long integration periods, signal processing devices often employ a large number of parallel correlation units, employing a brute force technique aptly named "massive correlation". Depending on the number of correlators, acceptable acquisition times can sometimes be achieved even under low signal power conditions. The term "tap" is generally used to mean the physical circuit element that can perform a single correlation operation between the incoming signal and the replica code with a certain frequency and code offset. Taps are generally organized into units called "channels" which are used to perform correlation over a selected code/frequency space.

As an example of massive correlation, a "hot start" with a GPS receiver may be considered, wherein the receiver has an estimate of its location and the present time or where there an estimate of time available through assistance data. Under such conditions, the search space can be equal to the full PN code space (1023 chips for civilian use) and some hundreds of hertz (Hz) in the frequency domain (for example, +/−150 Hz. The search range of a single tap might be, for example, ½ chip in the code space and +/−1/(3 T) in the frequency space (where T is the coherent integration time and 2/(3T) is called frequency bin). Thus, to cover the entire search space a set of around 16 thousands taps is needed.

Many GPS receivers implement even higher numbers of taps and can search more than one satellite in parallel. Other receivers use fewer taps, but must serialize the search of the single satellite into several steps. A "massive correlator" receiver is normally used to mean a receiver that has at least the potential to search for the whole code uncertainty (i.e. at least 2046 physical taps) in parallel for one satellite. The search in the frequency domain can be performed using post correlation Fast Fourier Transform (FFT), which is more efficient, or using physical taps, which is quite inefficient especially for high frequency uncertainties.

In general, more correlation resources mean higher production costs and more power consumption. Fewer correlation resources result in lower costs, but also result in longer acquisition times. It is thus desirable to maximize the performance of the correlation resources available to achieve the fastest acquisition times at the at lowest power, complexity and cost of production.

SUMMARY OF THE INVENTION

One aspect of the present invention relates to providing signal processing devices that efficiently use correlation resources.

It is a further aspect of the invention to provide signal processing methods for efficiently using correlation resources.

Another aspect of the invention relates to providing signal processing methods to efficiently use channel memory.

Yet another aspect of the invention relates to providing a signal processing method comprising performing a pre-detection stage and performing at least one distillation stage.

It is a further aspect of the invention to provide a signal processing method comprising performing a pre-detection stage and performing multiple distillation stages.

It is a further aspect of the invention to provide a signal processing method comprising performing at least one pre-detection stage, at least one intermediate stage and at least one distillation stage using channels normally reserved for signal tracking.

Another aspect of the invention relates to providing a signal processing receiver comprising a number of independent channels for use in confirming correlation peaks identified in at least one pre-detection stage.

A further aspect of the invention relates to providing a signal processing receiver comprising a correlation engine, further comprising a plurality of taps and a plurality of independent taps forming independent channels, the correlation engine operatively connected to a digital signal processing core, the digital signal processing core executing instructions that compare at least one output of the correlation engine to a predetermined threshold corresponding to a probability of detection after a number of integration intervals to identify at least two candidate peaks, the instructions further configured to direct at least two independent channels to confirm at least two candidate peaks.

Another aspect of the present invention is a signal processing receiver with at least one channel that has the capability to release taps that do not meet a certain probability of being aligned with the signal, that is, when the accumulation value of the tap drops below a certain level. If a tap or group of taps is released, it can be used for other purposes such as the acquisition, confirmation or tracking of another signal, or can simply be shut down to avoid wasting resources. In this way the at least one channel integrates predetection and distillation stages in non coherent integration and is able to release taps at the end of each integration interval.

DETAILED DESCRIPTION OF THE PREFERRED EMBODIMENTS

Figure 1:
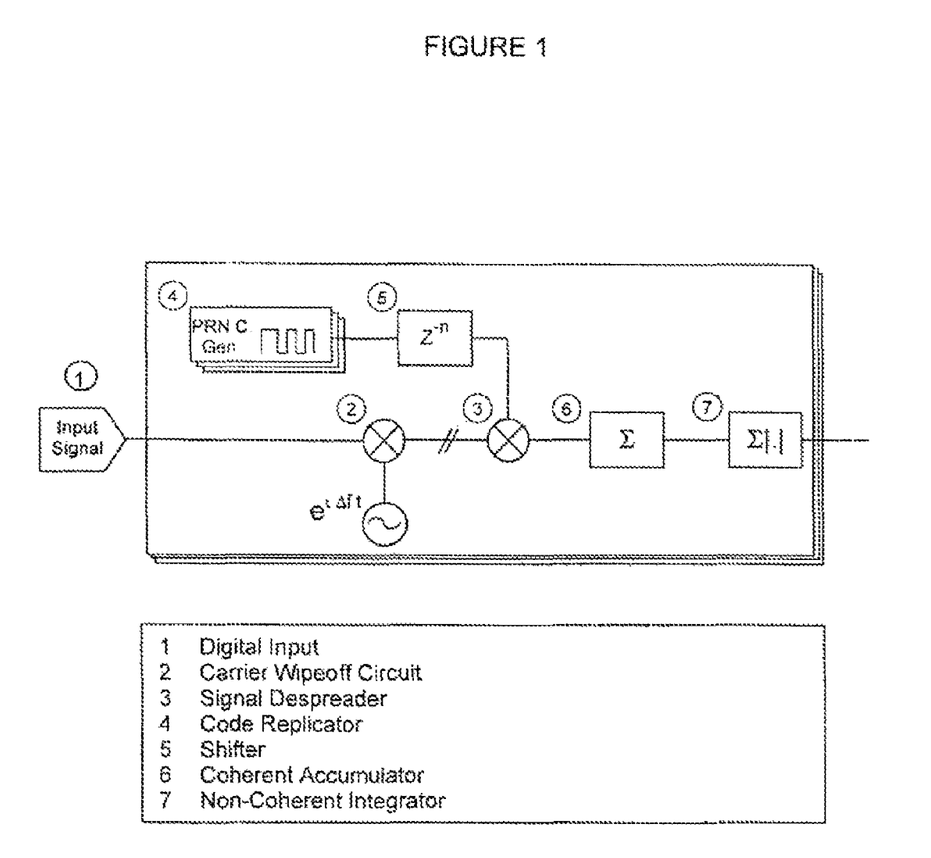
FIG. 1 is a schematic representation of a physical tap.

Preferred embodiments of the invention have circuitry elements or the software equivalents thereof for performing correlation. Such elements, when broken down into abstracted, individual units, may be referred to as "taps". A schematic diagram of a single tap is shown in FIG. 1. It will be recognized by those of skill in the art that a large number of tap configurations are possible, as well as serial and parallel combinations of multiple taps.

The tap shown in FIG. 1 has a digital input 1, where digital samples of the received signal are present. The digital input 1 is supplied to a carrier wipeoff circuit 2, which removes an estimated or known carrier wave from the digital samples. Such carrier wipeoff circuits are typically shared by a number of different taps. The samples are then supplied to a signal despreader 3.

Despreader 3 has two inputs, one being from wipeoff circuit 2, the originating from code replicator 4. The code replicator generates the known PN code for the particular satellite being searched. These codes can be generated by methods known in the art for civilian access to GPS satellites. The code generation may be serial (one chip after another) or parallel (more than one code chip at one time), or a combination thereof, depending on the correlation method in use. Typically one code replicator will be shared by more than one tap.

The output of code replicator 4 can be phase shifted by, for example, shifter 5, which is shown here in z-transformation form. Since a single code replicator may be shared by many taps, it is necessary to phase-shift the code so that different taps can correlate the known PN code to different signal positions.

Despreader 3 effectively multiplies the known, phase-shifted PN code generated by code replicator 4 with the signal originating from carrier wipeoff circuit 2. This is not only a necessary step in correlation, but also has the effect of dispreading the signal, if the known PN code is correctly aligned with the signal in the tap of concern.

After despreading at despreader 3, the signal is input into coherent accumulator 6, which effectively integrates the received signal. The integration is coherent because the sign of the received signal is included in the integration. The result of the coherent integration over a particular time period is then input to a non-coherent integrator 7, which sums the results without regard to sign, as an absolute value or square, for example.

During correlation of a signal, a correlation peak, or a high integration result is sought. The search for very low power signals requires long integration times, for example, 1 to 3 seconds, until a recognizable correlation peak appears. This corresponds to the sum of hundreds of coherent integrations, depending on the length of the interval chosen for coherent integration.

As a result of noise however, several correlation peaks will be found. GPS receivers generally deal with this situation by performing integration for long periods of time, until one signal emerges as the signal having the highest correlation value.

Embodiments of the invention comprise the decomposition of the search phase into a series of stages. Each stage implements a selection algorithm of the taps with the highest probability to be aligned with the signal. The first stage includes the performance of a signal search in the entire search space of a satellite signal, or in a subset of it. The search space is defined by the signal code and frequency uncertainties. At the end of this stage, the best candidates are selected with one of the methods described below. The second stage performs a further selection on the candidates identified in the first stage, applying similar principles to those used to select candidates in the first stage. Other stages can follow. The process may be configured to stop whenever the last stage is capable of producing a number of candidates equal or less than the number of tracking channels available in the receiver. A channel performing the first stage will be called "skimming" channel. A channel performing the second stage or any other following stage will be called "distiller" or "distillation" channel. The benefits of this approach as compared to the to the approach commonly implemented by GPS receivers will be explained hereinafter.

Figure 2:
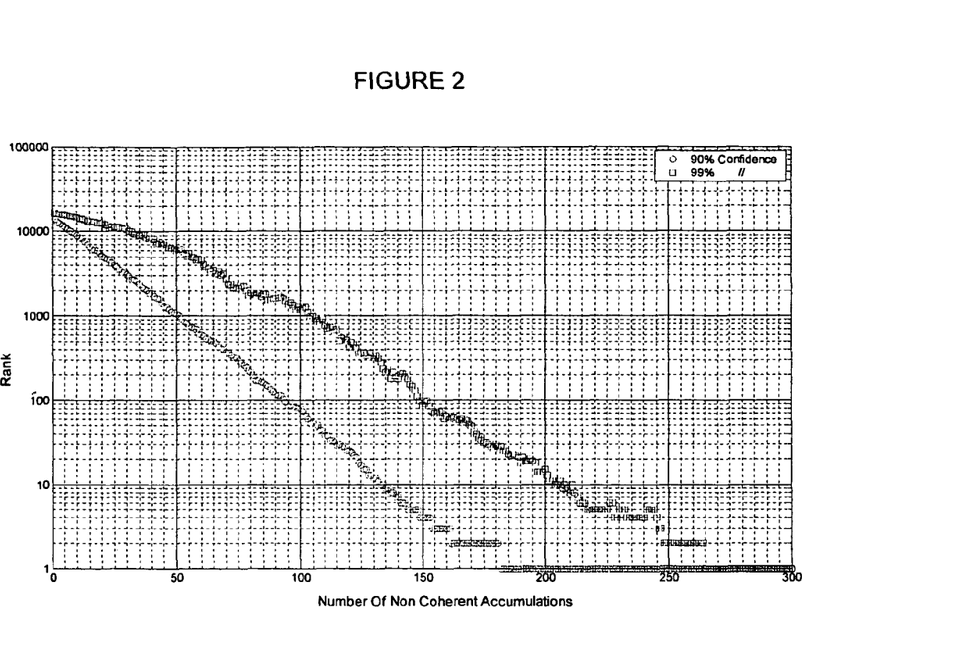
FIG. 2 is a typical plot of the ranking of the tap aligned with the signal with respect to all other taps for 90% and 99% confidence levels.

FIG. 2 shows two sets of theoretical data, corresponding to the following example. Let the search space uncertainty be 8 frequency bins and the full code space. In total, 16368 taps are needed to cover the uncertainty (1023×2×8). When the desired signal is present, the graph in FIG. 2 reports the ranking of the tap aligned with the signal with respect to all other taps as a function of the non-coherent integration interval. The horizontal axis in FIG. 2 can thus be viewed as the number of non-coherent integration intervals that have taken place.

The vertical axis is a logarithmic plot labeled "Rank", and represents a statistical quantity. It is here necessary to consider a large number of theoretical trial correlations, each operating on the same incoming signal with the same root mean squared noise power level, but where the noise is not correlated between trials. When trial is carried out, the integration value of the tap aligned with the signal can be compared to the integration values for all other taps, which are not aligned with signals, but may nonetheless have high values. If all values are arranged in a set, called E, and sorted, from highest value (at position 1) to lowest value, each tap can be assigned a "rank" corresponding to its position in the set E. Such a set E can be constructed for each integration interval, and for each trial. Each set E will look like a list of unique (non-repeating) numbers, the numbers ranging from 1 to 16368 and corresponding to each tap.

If a particular tap and particular integration interval are chosen, another set G can be constructed which contains the rank for that tap after the particular integration interval in each trial. If the tap in question is the tap aligned with the signal, the values (ranks) in the set G will approach the value 1 for increasing numbers of integration intervals. That is, the process of correlation "sorts out" the signal from the noise.

A scalar representation of the set G can be chosen as the supremum of the set. A supremum is a number a that satisfies the relationship $a \geq m$ for all m which are elements of L, where L is a set of numbers. The lowest supremum of G is thus the upper bound of G, or the lowest rank that is still greater than or equal to all of the individual ranks in G. One can further define an X % supremum to mean a number a that satisfies the relationship $a \geq m$ for X % of all m which are elements of L. For example, a 90% supremum satisfies the relationship above for 9 out of 10 elements of a set L. The lowest supremum or upper bound is then equivalent to the 100% supremum. For example, if L is the set of ten rankings {1, 1, 2, 1, 1, 5, 1, 1, 7, 4}, the lowest supremum or upper bound is seven while the 90% supremum is five.

After a low number of integration periods and a low-power signal, the tap aligned with the signal will still have an integration value which is dominated by the noise component of the signal and essentially random. The set G for the tap aligned with the signal at this stage will have a large number of different ranks between 1 and 16368. The upper bound of G can not be expected to be significantly lower than that for sets G of taps not aligned with the signal. As integration progresses, however, the set G of the tap aligned with the signal will be populated with more and more ranks closer to 1. This will decrease the upper bound of the set.

The vertical axis of the graph in FIG. 2 thus represents a supremum of a set G(N), where N is the particular integration interval according to the horizontal axis. The data plotted with circles, i.e. the lower curve represents the 90% supremum for the tap aligned with the signal. The data plotted with rectangles, the uppermost curve, represents the 99% supremum for the tap aligned with the signal As integration proceeds, however, the 90% and 99% supremum proceed toward the value 1.

Practically, the graph in FIG. 2 can be read as providing the number of integration periods required to produce a particular supremum with 90% and 99% confidence respectively for the tap aligned with the signal. For example, 180 integration periods will be the number required (at a particular signal and noise power) to have the tap aligned with the signal have the supremum 1 ninety percent of the time.

After the integration has been carried out over 180 intervals, the receiver will transfer the candidate with the 90% supremum in the set G equal to one to a confirmation and tracking stage. The confirmation stage is performed with a smaller number of "independent" taps. Independent taps are taps which are able to operate at an arbitrary code phase and in an arbitrary frequency bin. Independent taps thus allow the receiver to take the code phase and frequency bin from the tap producing the highest correlation value, and track the signal, regardless of the code phase and frequency of the signal.

Figure 3:
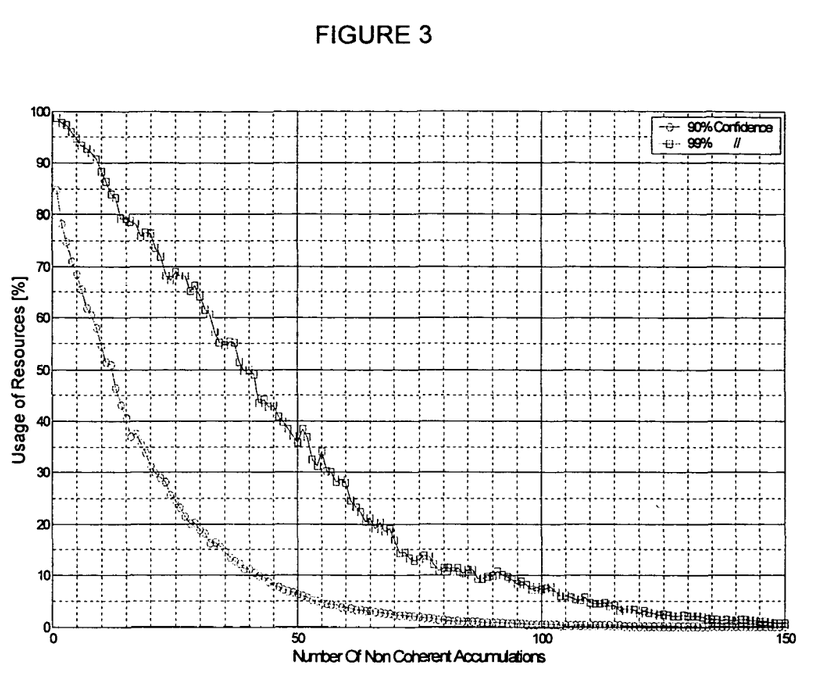
FIG. 3 is a typical plot of the use of channel resources versus integration time.

It is possible, however, to greatly increase the efficiency of this process. To illustrate the inefficiencies, the graph in FIG. 2 can be translated into a channel resources efficiency graph as shown in FIG. 3. FIG. 3 is a graph with a horizontal axis showing the number of non-coherent integration periods, similar to the graph in FIG. 2. The vertical axis of FIG. 3 is labeled "usage of resources %" and is a representation of the channel resources being productively used. The word "channel" represents the hardware and/or software required to process the search, for example the search described above over the full code space and 8 frequency bins, and comprises one or more taps. The productive use of channel resources means use in a way that tends to further the purpose of identification of the signal.

The graph in FIG. 3 can be explained in the following manner. If M is the supremum for the ranking of the tap aligned with the signal 90% of the time and after N non-coherent integration periods, then the optimal procedure, at least in terms of resource usage, would be to first use all of the taps for the first M accumulation periods. At the end of this period, the best M taps are chosen and all the other taps are released. That is, the channel stops using them for accumulation because 90% of the time the signal will not be among the taps that are being released. These taps can then be used for other purposes, such as the acquisition of a second signal. The quantity plotted in the graph in FIG. 3 thus represents the percentage of taps usefully dedicated to this signal at a 90% and 99% confidence level.

The graph may be calculated in the following manner. After any number of integration periods N, the tap aligned with the signal will have a X % supremum of M. That is, the taps with X % suprema from M to 1 are still needed to sort the aligned signal out from the non-aligned signal. The remaining taps are wasted. The percentage of usefully employed taps at X % confidence is thus ((total number of taps−X % supremum)/(total number of taps))×100%. The graph in FIG. 3 informs us that the total power of the taps is needed only for the early stages of accumulation. For example, after less than ⅓ of the time, e.g. 50 accumulations in the graph of FIG. 3, the receiver is using only 6% of the resources.

The receiver can be provided an estimate of the confidence level of a particular ranking at a particular carrier to noise level, integration value and number of integration periods through statistical analysis. The results of the non-coherent accumulation Y can be modeled as a stochastic variable with a $\chi^2$ (chi-squared) distribution (in case no signal is present) and a non-central $\chi^2$ in case a signal is present.

$$Y = \sum_{i=1}^{n_{Acc}} (I_i^2 + Q_i^2) \tag{1}$$
$$P_{Signal}(Y) = \chi^2(Y, \lambda(n_{acc}), \delta(n_{acc}))$$
$$P_{Noise}(Y) = \chi^2(Y, \delta(n_{acc}))$$

where $I_i$ and $Q_i$ are the result of the $i^{th}$ correlation of the incoming $I_T$ in phase signal and $Q_T$ quadrature phase signal with a pseudorandom replica code for a dwell time period T.

To completely define the two distributions we need two parameters well know to those skilled in the art: the degree of freedom ($\delta$) and the non-centrality parameter ($\lambda$). In both cases the degree of freedom is set, for present purposes, at two times the number of accumulations. Given the carrier to noise ratio of the signal, the non-centrality parameter of the non-central $\chi^2$ is computed as shown in the following paragraphs.

Let $\sigma_n$ be the noise floor:

$$\sigma_n = RMS(I_T)|_{T=1\,ms} = RMS(Q_T)|_{T=1\,ms} \tag{2}$$

where $I_T$ and $Q_T$ are the result of the correlation of the incoming $I_T$ in phase signal and $Q_T$ quadrature phase signal with a pseudorandom replica code for a dwell time period T (T=1 ms in this example). The above formula applies when the input signal is made of pure noise.

Let now T be the coherent integration interval. T can range between 1 and 20 ms, but at very low signal levels i.e. −150 to −160 dBmW 16 ms is the typical value. The amplitude A of the correlation function after the coherent integration interval T is then:

$$A = 20\left[\sqrt{2T}\,\sigma_n 10^{\frac{C/N_0}{20}}\right] \tag{3}$$

where $C/N_0$ is the Carrier to Noise ratio. Here the term correlation is used not to refer to the act of correlating a received signal with a known signal, but rather the statistical correlation function. The non-centrality parameter, normalized with the noise power is given by:

$$\lambda = n_{acc}\left[\frac{A}{\sqrt{20}\,\sigma_n}\right]^2 = 40 n_{acc} T 10^{\frac{C/N_0}{10}} \tag{4}$$

The non-central distribution given the signal $C/N_0$ and the number of non-coherent accumulations $n_{acc}$ model the statistics of the accumulation result Y, which is the sum of the squares of $I_i$ and $Q_i$. The actual accumulation of powers is not particularly efficient to implement in receiver hardware. Instead, the signal envelope $$Y = \sum_{i=1}^{n_{Acc}} \left(\sqrt{I_i^2 + Q_i^2}\right) \tag{5}$$

is often accumulated. Numerical simulations have shown that all the results that are valid for the sum of powers are applicable also to the sum of envelopes. Substituting we get:

$$Y = \sum_{i=1}^{n_{Acc}} (I_i^2 + Q_i^2) \tag{6}$$
$$P_{Signal}(Y) = \chi^2\left(Y, 40 n_{acc} T 10^{\frac{C/N_0}{10}}, 2n_{acc}\right)$$
$$P_{Noise}(Y) = \chi^2(Y, 2n_{acc})$$

$P_{Signal}$ is the probability that for a given accumulated value Y, Y is the result of a signal whose Carrier to Noise ratio is $C/N_0$. $P_{Noise}$ is likewise the probability that for a given the accumulated value Y, Y results from noise.

Defined is also the cumulative probability function, that is $$P_{Signal}(Y > \tau) = 1 - X^2\left(\tau, 40 n_{acc} T 10^{\frac{C/N_0}{10}}, 2n_{acc}\right) \tag{7}$$
$$P_{Noise}(Y > \tau) = 1 - X^2(\tau, 2n_{acc})$$

$P_{Signal}(Y>\tau)$ is the probability that the accumulated value Y is greater than a particular threshold $\tau$, whenever Y is the result of a non-coherent accumulation of signal plus noise with a ratio $C/N_0$. $P_{Noise}(Y>\tau)$ is the probability that given the accumulated value Y is greater than $\tau$, whenever Y is only noise (no signal). The following formula is based on the above statistic and is used to compute the number of accumulations $n_{acc}$ required to the tap aligned with the signal to accumulate a value that with a confidence equal to $\rho_{confidence}$ has a rank equal to $\rho$.

$$\begin{cases} 1 - \int_0^\infty \mathcal{I}(1 - \chi^2(\tau, \delta(n_{acc}))) X^2(\tau, \lambda(n_{acc}), \delta(n_{acc})) d\tau < 1 - p_{confidence} \\ \mathcal{I}(\wp) = \left[\sum_{k=0}^{m} \binom{k}{\rho}(1-\wp)^{\rho-k}(\wp)^k\right] \end{cases} \tag{8}$$

Once an estimate of the number of wasted channels is available to the receiver, it becomes possible to implement a more efficient scheme using multiple distiller and pre-detection stages.

The potential for the use of a pre-detection stage is clear from the examples depicted in the graphs of FIGS. 2 and 3. Suppose that a receiver has one channel capable of performing signal confirmation/tracking. After 180 integration periods, it is apparent from FIG. 2 that the tap aligned with the signal will have reached at least the rank 1 with 90% confidence. That means that the best peak can be transferred to this independent channel for signal confirmation after 180 integration periods. This is the approach commonly used in massive correlation. 16368 taps were used to integrate for the 180 integration periods.

Correspondingly, after 135 integration intervals, 10 highest peaks can be identified, among which there is a 90% chance of finding the tap aligned with the signal. If 10 independent channels for confirmation are available, the vast majority of correlation resources can be saved after only 135 integration intervals. After 90 integration intervals, 100 highest peaks can be identified, among which there is a 90% chance of finding the tap aligned with the signal. If 100 independent channels for confirmation are available, the vast majority of correlation resources can be saved after only 90 integration intervals (i.e. the whole mass of resources 16368 taps will be used only for half the time as compared to the common massive correlation approach). Once the candidates have been released to the smaller distiller channel, the massive correlation channel can be used for the pre-detection stage of another signal. The hierarchical structure pre-detection/distiller allows one to introduce a certain degree of parallelism through a sort of pipelining and the optimization of resource usage.

The advantage of this technique in terms of Time to First Fix, one of the key performance parameter of a GPS receiver, can be easily quantified. In particular the time needed to acquire the first satellite is greatly reduced. Given the signal level, the probability of detection at a certain signal level and the code frequency uncertainty, the exemplary architecture (e.g. with a 100 candidates) can be as much as twice as fast as compared with a classical massive correlation approach (Oust one candidate). The added complexity is in the distiller engine, but as far as the memory consumption (i.e. chip size and cost) of the latter is concerned, typically only about 1/20 of the memory will be required by the pre-detection channel.

The previous examples illustrate a single distiller phase. It is also anticipated, however, that multiple distillation phases can be implemented that will improve the efficiency of the embodiments of the present invention. Care should be taken at the design stage to ensure that the correct desired probability of detection results when multiple distillation stages are used.

The use of a large number of distillation phases would result in a quasi-continuous process (or discrete process with very fine steps) that is optimal in terms of the immediate release of unneeded channel resources. When the overall design is considered, however, other factors in design such as component complexity and power consumption may make such a quasi-continuous process suboptimal.

It is believed that channel resources in current GPS receivers can be re-tasked to implement the embodiments of the invention. This will generally be possible through the reallocation of at least a certain number of independent taps, otherwise dedicated to tracking, to the process of distillation of a number of correlation peaks identified after a pre-detection stage and one or more distillation stages.

Figure 4:
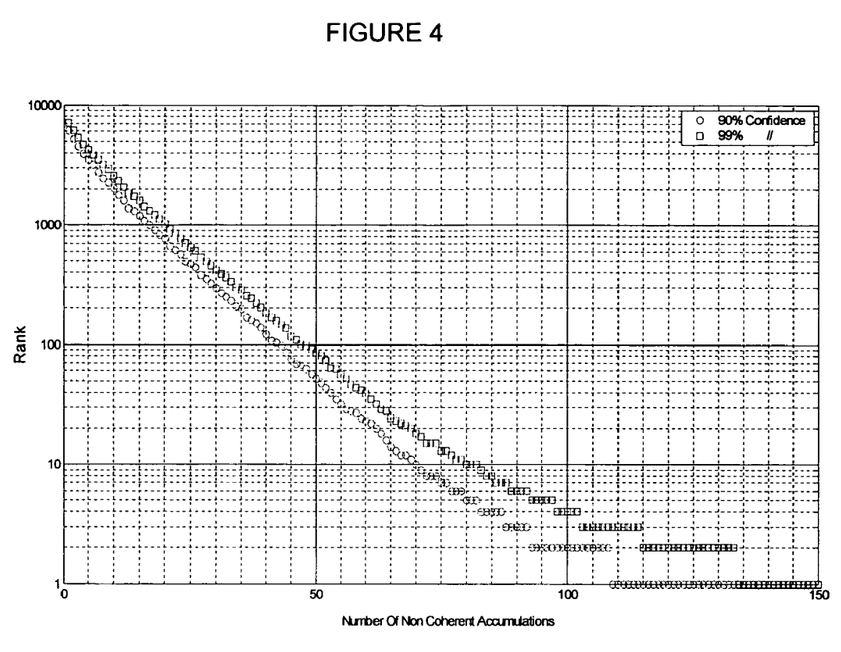
FIG. 4 is a typical plot of the ranking of the tap aligned with the signal with respect to all other taps for 90% and 99% confidence levels, after a pre-detection phase with a probability of detection of 40%.

At very low signal levels the acquisition engines are generally designed to work with quite low probability of detection. It can be demonstrated that the lower the probability of detection the higher the efficiency of the proposed method. As an example for the use of a pre-detection stage with a low detection threshold, the graph in FIG. 4 shows a computed ranking statistic, whereby only the trials in which the signal accumulation value Y passed the threshold $\tau$ at the pre-detection phase were considered. A 40% probability of detection $P_D$ was taken into account for this example. That is, the statistical methods described above were used to calculate a threshold $\tau$ that corresponds to a probability of detection $P_D$ of 40%. for the particular noise level and integration interval after a particular number of accumulation intervals $n_{acc}$. Taps showing accumulation values higher than $\tau$ the threshold after $n_{acc}$ intervals were carried forward for distillation, where a 90% or 99% confidence level was used.

The computation of the threshold T for a given number of accumulations $n_{acc}$ proceeds as follows:

$$P_{Signal}(Y>\tau)>P_D \tag{9}$$

The threshold T is the maximum value that satisfies the inequality below $$[1-X^2(\tau,\lambda(n_{acc}),2n_{acc})]>P_D \tag{10}$$

The non-centrality parameter as a function of the number of non-coherent integration samples is given by:

$$\lambda = 40 n_{acc} T 10^{\frac{C/N_0}{10}} \tag{11}$$

The graph in FIG. 4 shows that under the above-mentioned conditions, the accumulation time required to the tap aligned with the signal to accumulate a value that has a rank of 10 (90% of the time) is half the time required to accumulate a value that has a rank one (90% of the time). Moreover, it shows that the accumulation time required to the tap aligned with the signal to accumulate a value that has a rank of 100 (90% of the time) is one fourth the time required to accumulate a value that has rank one (90% of the time). In terms of time to acquire the first satellite, it means that with a 40% probability of detection, the efficiency of the proposed method is even higher (it indeed doubles as compared to the previous example). The pipelining results in a factor of four efficiency increase, provided four distiller engines are available. The suggested method, with a slight increase in terms of memory usage and hardware complexity is 4 times faster than a traditional architecture.

Figure 5:
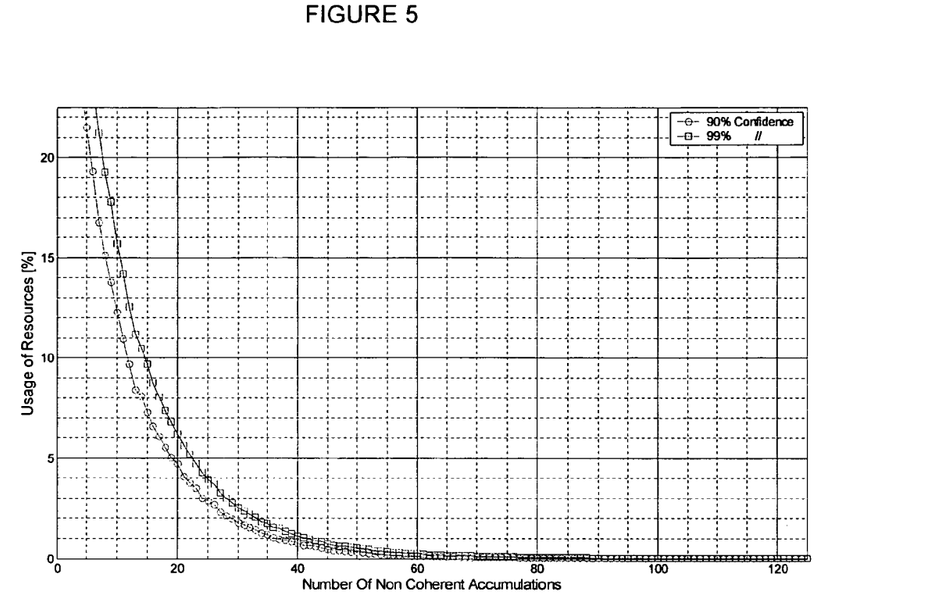
FIG. 5 is a typical plot of use of channel resources versus integration time, after a pre-detection phase with a probability of detection of 40%.

The graph in FIG. 5 is the graph in FIG. 4 translated into a channel resources usage graph, using the same method as was used to transform the graph from FIG. 2 into the graph of FIG. 3. Here the usage of channel resources per integration period is significantly reduced even at lower levels of integration after a pre-detection stage is carried out.

Figure 8:
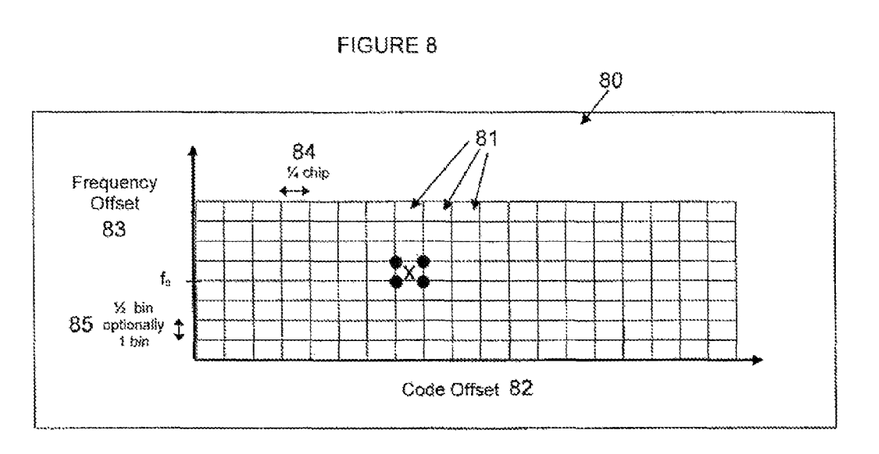
FIG. 8 is a diagram showing a conceptual representation of a section of a code phase-frequency search space.

FIG. 8 shows a frequency/code search space 80, wherein each of the many domains 81 represents a candidate, or a code offset-frequency offset pair. FIG. 8 has a horizontal axis 82 which represents the code space to be searched, and a vertical axis 83 which represents the frequency space. A single, exemplary candidate 81 is marked with an "X".

FIG. 8 shows, in a representative fashion, a large number of candidate pairs 81. One of the main objectives is to obtain a smaller set of candidates. In certain embodiments of the invention, the distiller channel differs from the pre-detection channel in two ways. The first is the chip spacing during the search phase. For each candidate provided by the pre-detection channel for taps at a quarter chip distance 84 and one or one-half bin distance 85 are enabled in order to continue the search on the candidate.

As far as the candidate selection criterion is concerned two methods are exemplary. The first method is similar to the one applied for the pre-detection channel: at the end of a fixed period of non-coherent accumulation the candidates with the highest accumulation values are selected. The difference is that this time the comparison of the accumulated values against the threshold is not applied. The second consists in a real-time evaluation of the probability of the candidate tap to be a signal based on the Bayes formula. The method proceed as follows:

Let $P_{Sig}(n)$ be the probability (i.e. the degree of confidence) of signal presence at the channel tap. At step 0, the process has no guess as to whether the tap in question is aligned with the signal, and $P_{Sig}(0)=0.5$ After the first non-coherent accumulation period we update our degree of confidence:

$$P_{Sig}(1) = \frac{P_D P_{Sig}(0)}{P_D P_{Sig}(0) + (1 - P_{Sig}(0))P_{Fa}} \quad (12)$$

where $P_D$ is the probability that the measurement $\upsilon$ is generated by a channel where there is signal, while $P_{Fa}$ is the probability that the measurement is generated by a channel where there is no signal. After a certain number of steps the candidates with the highest probability are selected. This latter method in general promotes the best performance.

The measurement event can be the result of a comparison with a threshold, or the value of the measurement itself. In the first case, $P_D$ is given by the Bernoulli trial:

$$P_D(\upsilon) = \begin{cases} p_D & \upsilon > V_{th} \\ 1 - p_D & \upsilon \leq V_{th} \end{cases} \quad (13)$$

In the second case the probability is given by a non-central chi-square distribution probability density function ($X^2$)

$$P_D(\upsilon) = X_{\lambda,\sigma,dof}^2(\upsilon^2) \quad (14)$$

As far as the $P_{FA}$ is concerned, if the measurement event is the result of the comparison wrt a threshold then $P_{FA}$ is given by the Bernoulli trial probability function.

$$P_{FA}(\upsilon) = \begin{cases} p_{FA} & \upsilon > V_{th} \\ 1 - p_{FA} & \upsilon \leq V_{th} \end{cases} \quad (15)$$

In the second case the probability is given by a central chi square distribution probability density function:

$$P_{FA}(\upsilon) = \chi_{\lambda=0,\sigma,dof}^2(\upsilon^2) \quad (16)$$

For all the above probability $\upsilon$ is the power accumulated in the last coherent accumulation period T.

An optimal distiller will proceed until its list of candidates is reduced to a number that would fit in a third stage distiller or that is comparable with the number of tracking channels. In general the distiller's primary function is not the confirmation of a signal. An optimal distiller should not alter the overall probability of detection. The probability of detection is, in fact, the product of the probability of detection of the stages that go from the pre-detection to the final confirmation. As long as the pre-detection stage normally starts with a low probability the following should be much higher.

Figure 6:
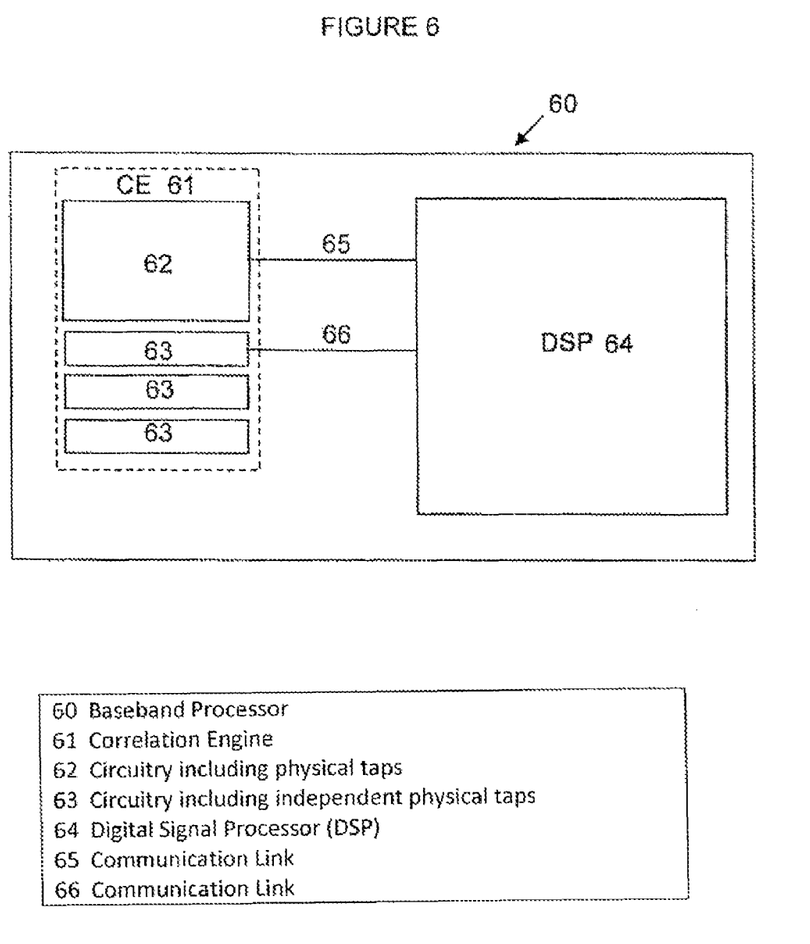
FIG. 6 is a block-level diagram of a baseband processor for a signal receiver according to one set of embodiments of the present invention.

FIG. 6 is a block-level diagram of a baseband processor 60 as used in a signal receiver according to embodiments of the invention, having a correlation engine 61, which may be repeated multiple times, having circuitry 62 including a number of physical taps and circuitry 63 including a number of independent physical taps. The correlation engine 61 is operatively connected to digital signal processor (DSP) 64, over communication links 65 and 66, which usually comprise both data interconnects and control signal interconnects. DSP 64 is generally a microprocessor or microprocessor core of a kind known in the art, executing instructions that allow it to govern the use of correlation resources within a signal receiver, but it is clear that the DSP could be a hardware control circuit operating without software. Baseband processor 60 is shown here implemented as a single integrated circuit, but could comprise multiple integrated circuits or could include further components on the same integrated circuit, such as a navigation processor and/or a radio frequency circuit.

Correlation engine 61, after receiving the signal over inputs not shown in FIG. 6, begins a search over a frequency/code search space determined by the DSP 64. After a period of time, as determined by the DSP based on preset conditions or correlation peak strength as described above, the DSP identifies correlation peak candidates that exceed a threshold as described above, and further receives the code phase and frequency bin of each tap aligned with the identified correlation peaks over link 65. The DSP is thus configured to identify candidates for a pre-detection stage and to present these candidates to independent channels to distill, confirm and ultimately track them. This information is then used to direct the independent channels 63 to further correlate and confirm the identified peaks.

Figure 7:
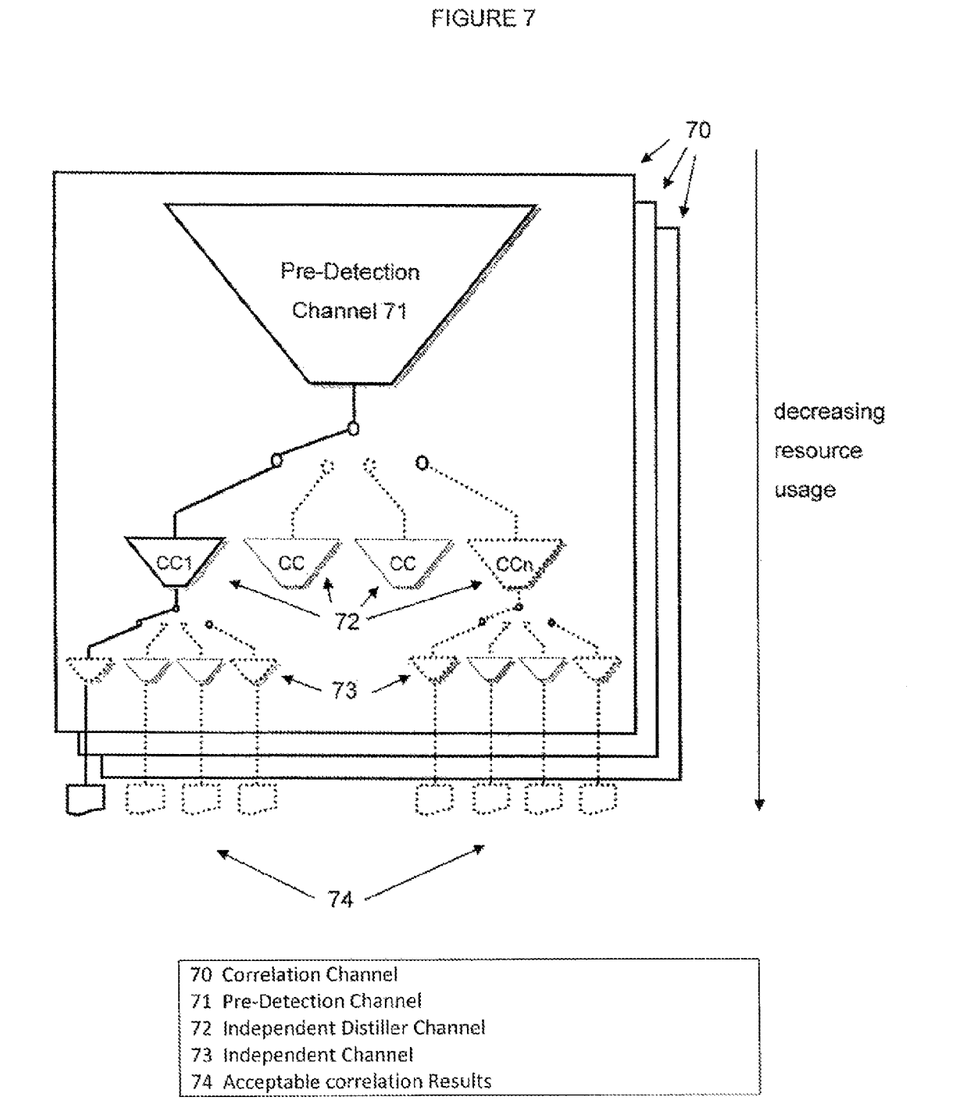
FIG. 7 is a diagram showing channels operating in accordance with an embodiment of the invention.

FIG. 7 shows a functional diagram of channels operating within an embodiment of the present invention. FIG. 7 has a number of correlation channels 70, shown by the stacked layers. Each correlation channel has a pre-detection channel 71, where an acquisition search begins and where the greatest amount of correlation resources are concentrated. After a partial correlation and identification of a number of candidate peaks, the acquisition search can be carried forward in any of a number of independent distiller channels 72, where a distillation stage is carried out. When the integration has been carried forward by a channel 72 for a period of time (a further partial correlation), a smaller subset of candidate peaks can be identified, and carried forward again in a further distillation stage at one of the plurality of available independent channels 73 within each channel 72.

Division of pre-detection channel 71 into distillation channels 72 or the division of distiller channels 72 into further distiller channels 73 does not necessarily indicate the addition of further physical channels, but rather shows the division of the correlation into smaller sub-correlations that require fewer resources. In fact, it is possible simply to release the unneeded portions of each channel at each stage of the correlation process. It should also be clear to a person of skill in the art that a large number of distillation stages can be employed, each successive stage operating with a smaller amount of resources, until finally acceptable correlation results 74 are obtained.

It will be apparent that in this way a large number of candidate peaks can be identified and distilled, and that multiple distillation stages can be implemented, saving significant resources as described above. Furthermore, it will be apparent to those of skill in the art that the specific examples contained herein can be applied to a wide variety of practical cases according to the specific design and needs of the particular application.

I claim:

1. A signal processing method, comprising
    receiving a signal;
    performing a plurality of correlation steps over an entire code-frequency search space using a correlation engine having associated correlation resources to form a plurality of correlation results, the plurality of correlation results being associated with a number of accumulations;
    identifying from among the correlation results at least two candidates having at least a predetermined probability of alignment with a desired signal, the probability of alignment corresponding to the number of accumulations, wherein each candidate comprises a code offset-frequency pair;

rejecting all candidates aside from the at least two candidates;
further correlating the at least two candidates;
identifying a candidate from the at least two candidates that represents the desired signal; and
wherein the step of further correlating the at least two candidates is conducted using fewer correlation resources of the correlation engine than are used in forming the plurality of correlation results.

2. The method of claim 1, wherein the step of identifying from among the correlation results at least two candidates comprises identifying at least N candidates, where N is a number greater than ten, and the step of further correlating the at least two candidates comprises further correlating the at least N candidates.

3. The method of claim 2, further comprising the steps of identifying a number less than N of intermediate candidates from the at least N candidates and further correlating the less than N intermediate candidates.

4. The method of claim 3, wherein the number N is at least one hundred.

5. The method of claim 1, wherein the desired signal has a power level less than or equal to -145 dBmW.

6. A signal processing method, comprising:
receiving a first signal;
performing a pre-detection stage comprising a number of accumulations corresponding to a confidence level that results of the pre-detection stage have at least a predetermined probability of alignment with a desired signal;
releasing based on the results of the pre-detection stage a fraction of the correlation resources used in the pre-detection stage for the processing of a second signal;
identifying at least two candidates from the results of the pre-detection stage;
the at least two candidates having the at least a predetermined probability of alignment with the desired signal, the probability of alignment corresponding to the number of accumulations; and performing at least one distillation stage with the first signal based on information obtained for the at least two candidates.

7. The method of claim 6, wherein the step of performing at least one distillation stage comprises performing at least two distillation stages.

8. The method of claim 7, wherein at least one distillation stage is performed after every non-coherent integration interval after the pre-detection stage.

9. The method of claim 6, wherein the step of receiving the first signal comprises receiving a GNSS signal with a signal power of less than or equal to -145 dBmW.

10. A signal processing receiver, comprising:
a correlation engine configured to correlate a known code against a received signal and comprising at least three channels;
a processor operatively connected to the correlation engine and in communication with a memory with executable instructions for carrying forward by at least two of the at least three channels a partial correlation performed by one of the at least three correlation channels in response to a determination that a result of said partial correlation exceeds a predetermined probability for detecting a desired signal, said predetermined probability corresponding to a number of accumulations of the correlation engine, wherein carrying forward the partial correlation comprises identifying at least two candidates having at least a predetermined probability of alignment with a desired signal, the probability of alignment corresponding to the number of accumulations; and
wherein the processor is further configured to release the one of the at least three correlation channels from correlation of the received signal when its partial correlation is complete.

11. The signal processing receiver of claim 10, wherein the correlation engine comprises at least one non-independent channel and at least two independent channels.

12. The signal processing receiver of claim 10,
wherein the at least three channels comprise a plurality of channel groups, each group having at least one channel member; and
wherein the executable instructions include instructions for carrying forward from a previous channel group to a successive channel group a correlation partially performed by the previous group.

13. The signal processing receiver of claim 12, wherein each successive group is a smaller subset of the previous group.

14. The signal processing receiver of claim 12, comprising at least three channel groups.

15. An integrated circuit comprising,
a correlation engine, the correlation engine further comprising a plurality of channels;
the plurality of channels having at least two independent channels; a subgroup of the plurality of channels being at least indirectly in communication, such that an acquisition search conducted by a channel can be further processed by at least two independent channels;
wherein each of the channels is configured to reject at least one corresponding candidate after an integration period in response to a determination that the at least one corresponding candidate does not exceed a predetermined probability for detecting a desired signal, said predetermined probability corresponding to the integration period,
and identifying at least one corresponding candidate having at least a predetermined probability of alignment with the desired signal, the probability of alignment corresponding to a number of accumulations during the integration period; and
wherein at least one channel is configured to be released after rejection of a plurality of candidates.

16. The integrated circuit of claim 15, wherein the subgroup of the plurality of channels being at least indirectly in communication are in communication via a digital signal processing core.

17. The integrated circuit of claim 15, wherein the at least two independent channels comprise at least ten independent channels, at least two of which are not configured for use as signal tracking channels.

18. The integrated circuit of claim 15, wherein the plurality of channels consists only of independent channels.

19. The integrated circuit of claim 15, wherein the plurality of channels comprises at least one massive-correlation channel.

20. A signal processing apparatus comprising:
means for receiving a first signal;
means for performing a pre-detection stage comprising a number of accumulations corresponding to a confidence level that results of the pre-detection stage have at least a predetermined probability of alignment with a desired signal;
means for releasing based on the results of the pre-detection stage a fraction of the correlation resources used in the pre-detection stage for the processing of a second signal;

means for identifying at least two candidates from the results of the pre-detection Stage, the at least two candidates having the at least a predetermined probability of alignment with the desired signal, the probability of alignment corresponding to the number of accumulations; and distillation means for performing at least one distillation stage with the first signal based on information obtained for the at least two candidates.

21. The signal processing apparatus of claim 20, wherein the distillation means are configured to perform at least two distillation stages based on information obtained for the at least two candidates.

22. The signal processing apparatus of claim 21, wherein the distillation means are configured to perform at least one distillation stage is performed after every non-coherent integration interval after the pre-detection stage.

23. The signal processing apparatus of claim 21, wherein the means for receiving the first signal comprise means for receiving a GNSS signal with a signal power of less than or equal to -145 dBmW.

24. A non-transitory computer-readable medium comprising computer-readable instructions recorded thereon that, when executed by a processor, are configured to cause the processor to:

perform a plurality of correlation steps over an entire code-frequency search space on a received signal using a correlation engine having associated correlation resources to form a plurality of correlation results, the plurality of correlation results being associated with a number of accumulations;

identify from among the correlation results at least two candidates having at least a predetermined probability of alignment with a desired signal, the probability of alignment corresponding to the number of accumulations, wherein each candidate comprises a code offset-frequency pair;

reject all candidates aside from the at least two candidates;

further correlate the at least two candidates; and identify a candidate from the at least two candidates that represents the desired signal, wherein further correlating the at least two candidates is conducted using fewer correlation resources of the correlation engine than are used in forming the plurality of correlation results.

25. The non-transitory computer-readable medium of claim 24, wherein the instructions are configured to cause the processor to identify at least N candidates, where N is a number greater than ten, and to further correlate the at least N candidates.

26. The non-transitory computer-readable medium of claim 25, wherein the instructions are configured to cause the processor to identify a number less than N of intermediate candidates from the at least N candidates and to further correlate the less than N intermediate candidates.

27. The non-transitory computer-readable medium of claim 25, wherein the number N is at least one hundred.

28. The non-transitory computer-readable medium of claim 24, wherein the desired signal has a power level less than or equal to -145 dBmW.

* * * * *